US012345413B2

(12) United States Patent
Johansson

(10) Patent No.: US 12,345,413 B2
(45) Date of Patent: *Jul. 1, 2025

(54) COMPACT WASTE COMBUSTION SYSTEM

(71) Applicant: Stefan Johansson, North Little Rock, AR (US)

(72) Inventor: Stefan Johansson, North Little Rock, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,104

(22) Filed: Apr. 15, 2024

(65) Prior Publication Data

US 2024/0410574 A1 Dec. 12, 2024

Related U.S. Application Data

(63) Continuation of application No. 17/184,148, filed on Feb. 24, 2021, now Pat. No. 11,959,635.

(60) Provisional application No. 63/150,575, filed on Feb. 17, 2021, provisional application No. 63/133,775, (Continued)

(51) Int. Cl.
| | |
|---|---|
| *F23G 5/12* | (2006.01) |
| *B01D 53/88* | (2006.01) |
| *C02F 11/06* | (2006.01) |
| *C02F 103/00* | (2006.01) |
| *F23G 5/50* | (2006.01) |
| *F23J 15/02* | (2006.01) |

(52) U.S. Cl.
CPC ............ *F23G 5/12* (2013.01); *B01D 53/885* (2013.01); *C02F 11/06* (2013.01); *F23G 5/50* (2013.01); *F23J 15/02* (2013.01); *C02F 2103/005* (2013.01); *C02F 2201/001* (2013.01); *C02F 2303/02* (2013.01); *F23G 2203/601* (2013.01); *F23G 2209/26* (2013.01)

(58) Field of Classification Search
CPC ........ A47K 11/023; F23G 7/001; C02F 11/06
See application file for complete search history.

(56) References Cited

U.S. PATENT DOCUMENTS 3,338,191 A * 8/1967 Frankel ................ A47K 11/023
4/111.3
3,592,151 A * 7/1971 Webber ................... F23G 5/085
110/255

(Continued)

OTHER PUBLICATIONS

Ieuropean Search Report—21167720.8—EPO—Aug. 27, 2021.

*Primary Examiner* — David J Laux
(74) *Attorney, Agent, or Firm* — Anthony G. Smyth; LOZA & LOZA, LLP

(57) ABSTRACT

A compact waste combustion system deployed within a portable toilet has a burn chamber that includes a processor, a burner, a trapdoor mechanism configured to seal an entrance to the burn chamber when the compact waste combustion system is operated in a first mode and a waste receptacle configured to feed waste material to the burn chamber through the trapdoor mechanism in a second mode of operation. The processor may be configured to detect presence of a waste in the waste receptacle, configure the system to operate in the second mode and to pass waste into the burn chamber, configure the compact waste combustion system to operate in the first mode after the waste has passed into the burn chamber, and activate the burner when the compact waste combustion system is operated in the first mode and the waste is located in the burn chamber.

1 Claim, 10 Drawing Sheets

Related U.S. Application Data filed on Jan. 4, 2021, provisional application No. 63/008,657, filed on Apr. 10, 2020.

(56) References Cited

U.S. PATENT DOCUMENTS

| | | | | |
|---|---|---|---|---|
| 3,694,825 | A * | 10/1972 | Kufrin | A47K 11/023 4/111.3 |
| 3,752,090 | A * | 8/1973 | Frankel | A47K 11/023 4/321 |
| 3,858,251 | A * | 1/1975 | Vollrath | A47K 11/023 4/111.3 |
| 4,162,656 | A * | 7/1979 | Dallen | B63J 4/006 110/221 |
| 4,285,282 | A * | 8/1981 | Good | F23L 15/04 110/255 |
| 4,516,510 | A * | 5/1985 | Basic, Sr. | F23L 1/02 110/211 |
| 4,937,411 | A * | 6/1990 | Suzuki | F23G 5/165 219/679 |
| 5,698,095 | A * | 12/1997 | Kami | E03D 5/016 210/179 |
| 7,014,778 | B2 * | 3/2006 | Fuchigami | A47K 11/023 110/165 R |
| 11,959,635 | B2 * | 4/2024 | Johansson | F23G 5/12 |
| 2006/0086294 | A1 * | 4/2006 | Gnedenko | F23G 5/085 110/229 |
| 2007/0227417 | A1 * | 10/2007 | Aguayo | F23G 5/004 110/276 |
| 2012/0012040 | A1 * | 1/2012 | Johansson | F23G 7/001 110/255 |
| 2014/0109545 | A1 * | 4/2014 | Flanagan | F23L 7/007 60/39.12 |
| 2015/0208883 | A1 * | 7/2015 | Aslaksen | A47K 11/023 4/111.4 |

* cited by examiner

COMPACT WASTE COMBUSTION SYSTEM

PRIORITY CLAIM

This application is a continuation of patent application Ser. No. 17/184,148 that was filed in the United States Patent Office on Feb. 24, 2021, which claims priority to and the benefit of Provisional Patent Application No. 63/008,657 filed in the United States Patent Office on Apr. 10, 2020, of Provisional Patent Application No. 63/133,775 filed in the United States Patent Office on Jan. 4, 2021, and of Provisional Patent Application No. 63/150,575 filed in the United States Patent Office on Feb. 17, 2021, and the entire content of these applications are incorporated herein by reference as if fully set forth below in their entirety and for all applicable purposes.

TECHNICAL FIELD

This invention relates to waste management, and more particularly to a waste combustion chamber that occupies a small amount of space suited to portable, mobile or remote standalone applications.

BACKGROUND

Incineration can be used to eliminate certain types of waste material, including sewage, gray water, and other waste products of a plumbing system. Systems that are used for incinerating waste materials can be bulky, immobile and involve complex operating procedures. Accordingly, such systems tend to have limited application and ongoing manual maintenance to remove ash materials, which tend to accumulate over time in such systems. Heretofore, no easy way of operating portable or mobile waste incineration systems has been devised. There is an ongoing need for technology, systems and apparatus that facilitate the deployment and use of incineration systems quickly and efficiently, including at locations where the infrastructure for removing or treating waste is lacking.

SUMMARY

A compact waste combustion system constructed or configured in accordance with certain aspects disclosed herein can be used for incinerating waste. The waste combustion system can be incorporated in small rooms, cabinets or enclosures. In some examples, the compact waste combustion system may be enclosed within a portable toilet. In various aspects of the disclosure, a compact waste combustion system has a burn chamber, a trapdoor mechanism configured to seal an entrance to the burn chamber when the compact waste combustion system is operated in a first mode, a waste receptacle configured to feed waste material to the burn chamber through the trapdoor mechanism, a burner disposed at least partially within the burn chamber and a processor. The processor may be configured to detect presence of a quantity of waste in the waste receptacle, configure the compact waste combustion system to be operated in a second mode. The trapdoor mechanism may be configured to permit the quantity of waste to pass into the burn chamber when the compact waste combustion system is operated in the second mode. The processor may be further configured to configure the compact waste combustion system to be operated in the first mode after the quantity of waste has passed into the burn chamber and activate the burner when the compact waste combustion system is operated in the first mode and the quantity of waste is located in the burn chamber.

In one aspect, the compact waste combustion system may be configured for use within a portable toilet. In another aspect, the compact waste combustion system may be configured for use within a moving vehicle. In certain aspects, a plurality of compact waste combustion apparatus or enclosures that incorporate the compact waste combustion systems may be deployed to support a temporary or urgent demand. In some implementations, one or more compact waste combustion systems may include a processing circuit that communicates with a controlling or monitoring system to provide status, maintenance and fault information. In some implementations, two or more compact waste combustion systems may communicate to coordinate operations.

In certain aspects, the compact waste combustion system includes a coupling configured to conduct a fuel supply to the burner, and an ignitor. The processor may be further configured to cause fuel to enter the burn chamber while the burner is activated, and activate the ignitor to ignite the fuel entering the burn chamber. The compact waste combustion system may include a blower configured to provide a flow of air while the burner is activated, and a diffuser configured to mix the flow of air with the fuel entering the burn chamber. The burner may include an electrical ignition coil.

In certain aspects, the compact waste combustion system includes a tray deployed within the burn chamber and configured to receive the waste material that is fed to the burn chamber through the trapdoor mechanism. The quantity of waste may be burnt within the tray when the burner is activated. A solid residue generated when the quantity of waste is burned may be retained by the tray. The compact waste combustion system may include a temperature sensor configured to provide measurements of temperature within the burn chamber. The tray may be removable from the burn chamber when the temperature within the burn chamber is below a maximum safe temperature and when the burner is deactivated.

In certain aspects, the compact waste combustion system includes an exhaust fan configured to draw gaseous products of combustion from the burn chamber and expel the gaseous products of combustion away from a portable toilet or other enclosure. The compact waste combustion system may include a filter configured to remove toxic or undesirable constituents from the gaseous products of combustion. The compact waste combustion system may include a catalytic convertor configured to remove toxic or undesirable constituents from the gaseous products of combustion.

In certain aspects, the waste receptacle is a toilet bowl within a portable toilet. The processor may be further configured to initiate a bowl rinse cycle using a water bag that is configured to provide flow of water to the toilet bowl. In certain aspects, the compact waste combustion system provides a user interface that includes a display panel configured to display status of the burn cycle. The user interface may include one or more user operated inputs used to configure the burn cycle. The compact waste combustion system may include one or more sensors configured to detect presence of a user within the portable toilet and deactivate the burner when presence of the user is detected.

DETAILED DESCRIPTION

Figure 1:
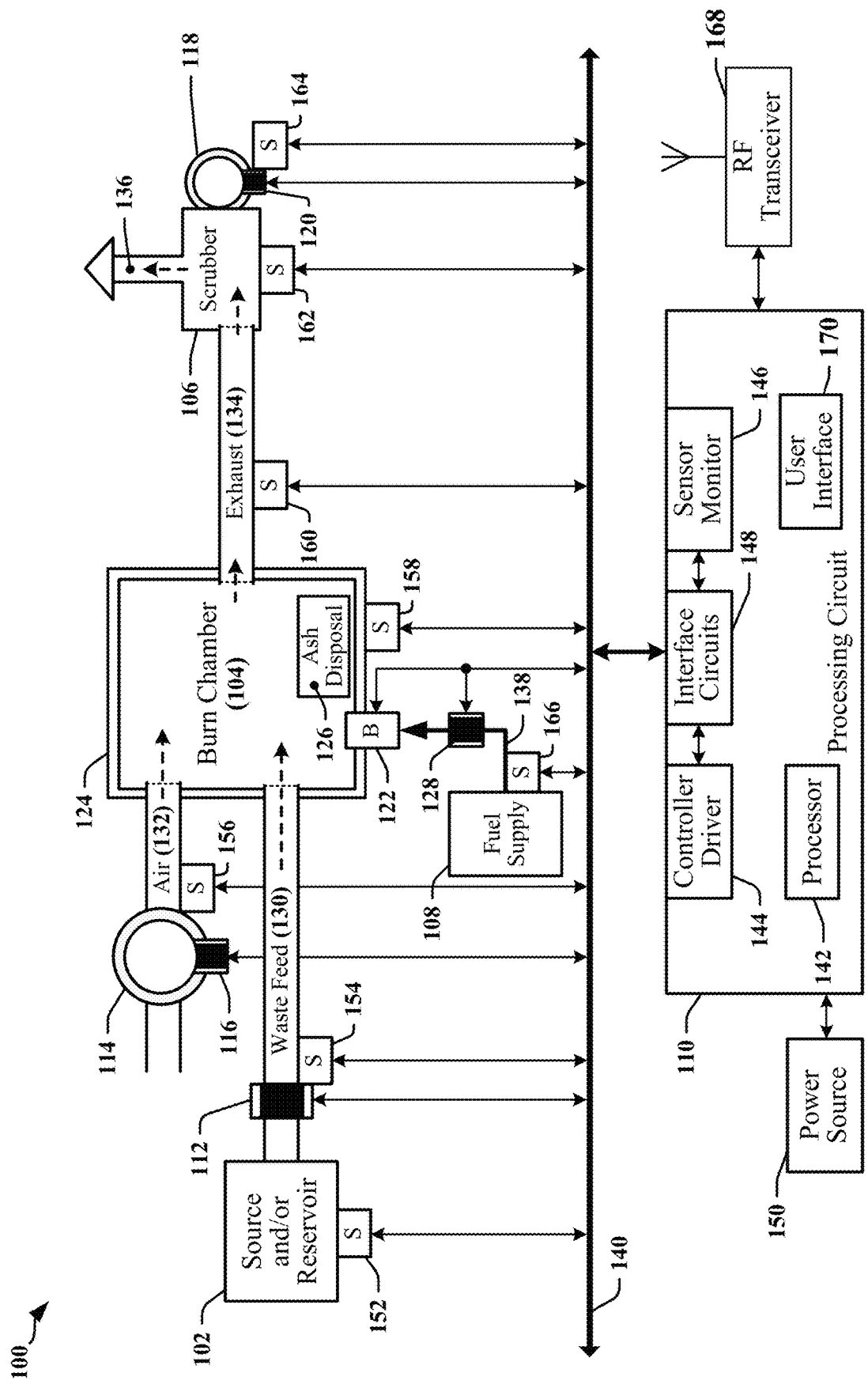
FIG. 1 illustrates an example of a hardware implementation for a waste incineration system in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of waste disposal systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Figure 2:
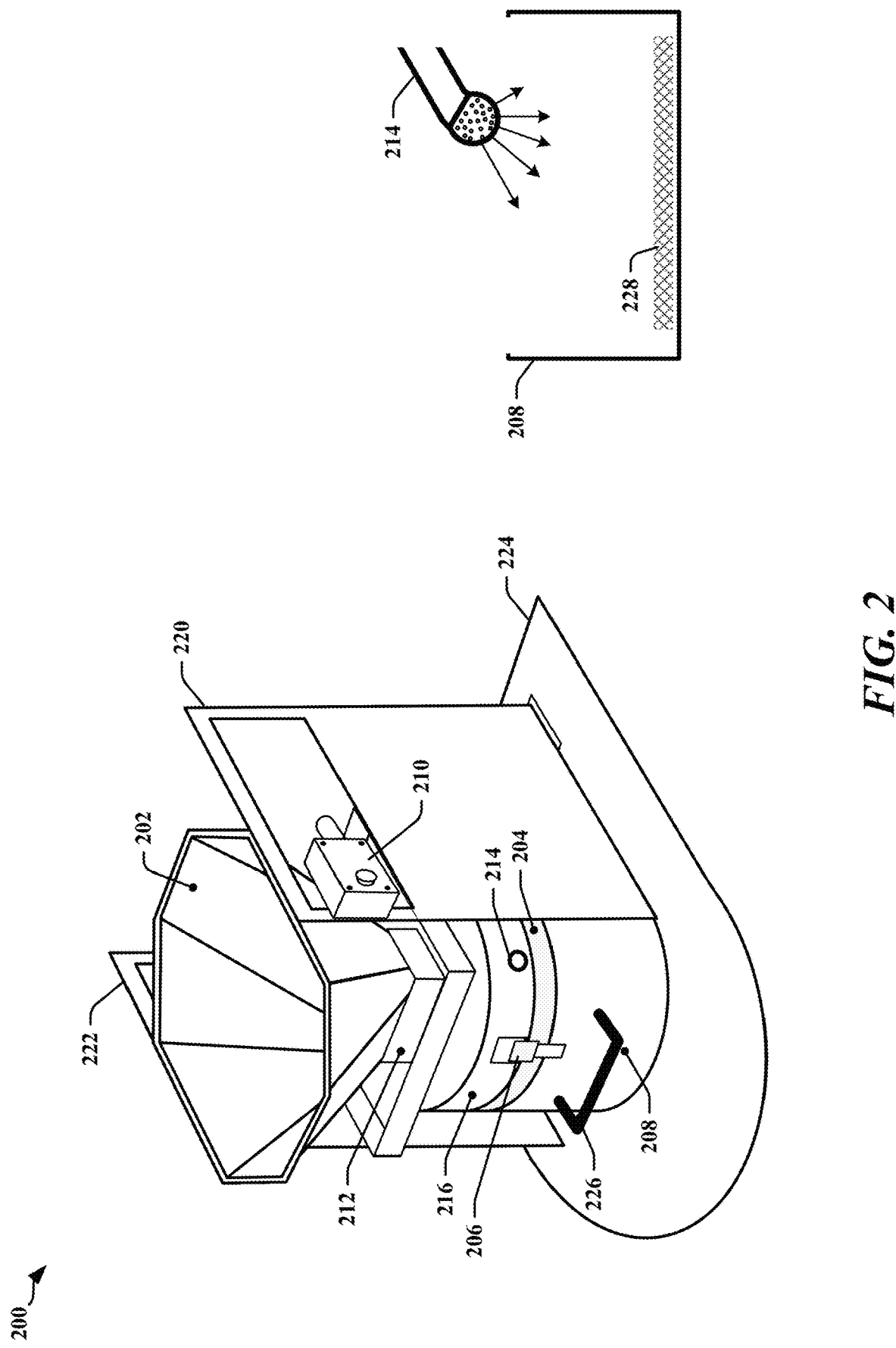
FIG. 2 illustrates an example of a system that includes a waste incineration system in accordance with certain aspects of the disclosure.
Figure 3:
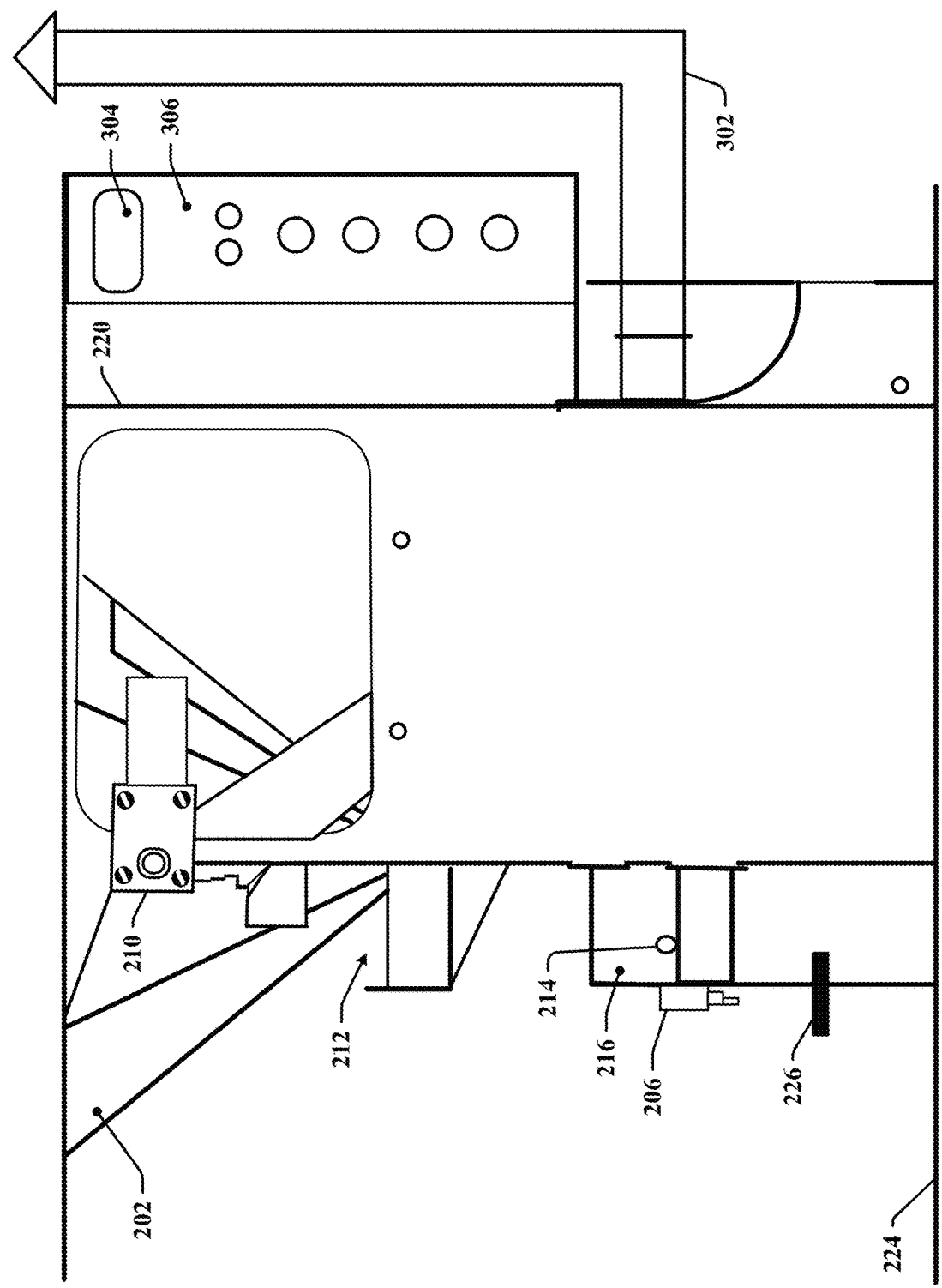
FIG. 3 provides a side view of a compact waste combustion system provided in accordance with certain aspects of the disclosure.
Figure 4:
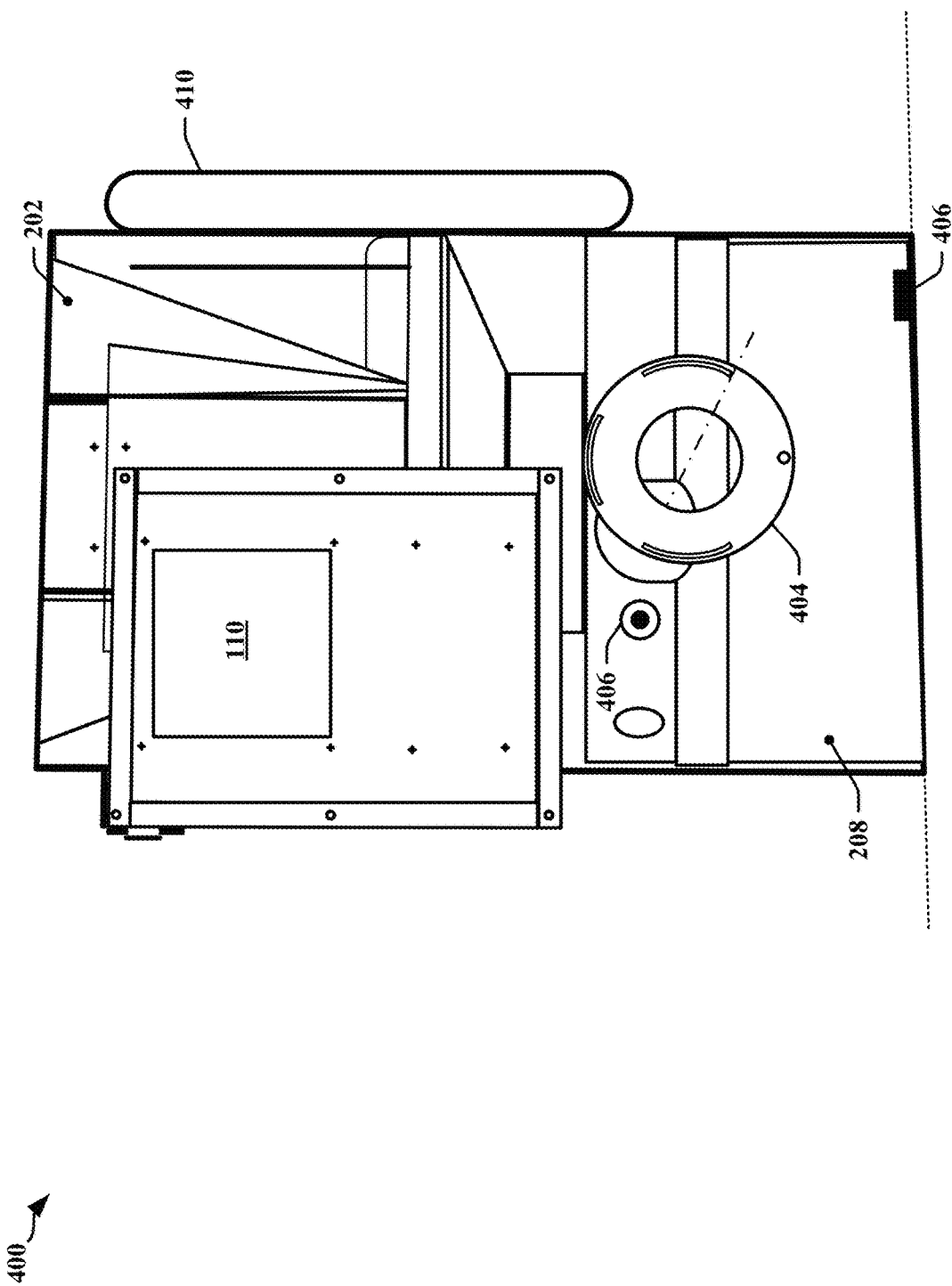
FIG. 4 provides a rear view of a compact waste combustion system provided in accordance with certain aspects of the disclosure.

A compact waste combustion system 100 provided in accordance with certain aspects of this disclosure is illustrated in schematic form in FIG. 1. FIG. 2 provides an example of a physical implementation 200 of the compact waste combustion system 100. FIGS. 3 and 4 provide a side view 300 and a rear view 400 of the physical implementation 200 of the compact waste combustion system 100. In some examples, the compact waste combustion system 100 may be coupled to a portable toilet or deployed within a portable toilet. The portable toilet may be deployed on a temporary or long-term basis where infrastructure is not available to support sanitation facilities or services. In some examples, the compact waste combustion system 100 may be deployed for use in time of emergency, natural disaster, hostility or other exigency. In some examples, the compact waste combustion system 100 may be deployed for use in camping, expeditions, construction sites, festivals, concerts or other preplanned activities. In some examples, the compact waste combustion system 100 may be deployed in remote settlements, attractions or underdeveloped regions where sanitation services are otherwise lacking. In some instances, the compact waste combustion system 100 may be deployed in ships, trains or other vehicles or modes of transport.

The compact waste combustion system 100 includes, or may be coupled to a waste receptacle or a waste reservoir 102. In a portable toilet, for example, an optional waste reservoir 102 may receive waste from a bowl 202 or another type of waste receptacle. In some examples, the waste receptacle or a waste reservoir 102 may be coupled to a burn chamber 104, 216 through an impeller or pump that pressurizes a waste feed conduit 130. In other examples, the burn chamber 104, 216 may receive gravity-fed waste, where waste received from a bowl 202 in the toilet is conducted under force of gravity to a tank and/or the waste reservoir 102, and then through a trapdoor mechanism 112, 212 to the burn chamber 104, 216. The burn chamber 104, 216 may also be referred to herein as an incineration chamber or as a combustion chamber.

The trapdoor mechanism 112, 212, or another airtight mechanism may be provided to prevent a backflow of gases or flames from the burner. In the example of the portable toilet, a trapdoor mechanism 112, 212 can be operated such that waste can restricted from entering the burn chamber 104, 216 until the burn chamber 104, 216 is idled, sufficiently cooled and/or fully evacuated of hot gases. In some implementations, the trapdoor mechanism 112, 212 can be sealed when a user enters or operates the portable toilet. The burn chamber 104, 216 may be idled when the user enters or operates the portable toilet. In certain implementations, a multi-chamber waste reservoir 102 may be used in order that waste may be received into a first chamber while an inner trapdoor leading to a second chamber is closed. The inner trapdoor may be opened to draw waste into the second chamber that feeds the burn chamber 104, 216. One or more outer trapdoors may be operated during transfer of waste from the first chamber to the second chamber, where one outer trapdoor may be configured to block a waste feed conduit 130 or passageway between the burn chamber 104, 216 and the second chamber and/or another trapdoor may be configured to block the waste feed conduit 130 or passageway between the first chamber and the bowl 202 or other waste receptacle that initially receives the waste.

The flow of waste in the compact waste combustion system 100 may be managed by a processing circuit 110. In one example, the trapdoor mechanism 112, 212 may be opened and closed under the control of the processing circuit 110. The processing circuit 110 may be electrically or wirelessly coupled to an actuator, motor, solenoid, electromagnetic or other electromechanical device 210 that can be configured to open, close and/or lock a trapdoor. The processing circuit 110 may monitor status of the trapdoor mechanism 112, 212 based on indications received from one or more sensors 154 associated with the trapdoor mechanism 112, 212.

The processing circuit 110 may monitor collection, storage and flow of waste based on indications or measurements received from one or more sensors 152 associated with the waste reservoir 102, and/or one or more sensors 154 associated with the trapdoor mechanism 112, 212, waste feed conduit 130 and/or a waste feed pump. In some instances, pumps, impellers or fans activated when conducting waste may include internal sensors that can provide event or status information. measurements and other information to the processing circuit 110. The sensors 152, 154 associated with a waste reservoir 102 and waste feed conduit 130, trapdoor mechanism 112, 212 or a waste pump or impeller may provide measurements related to temperature, pressure, levels of fluid, rate of flow, direction of flow, etc. The sensors 152 associated with the waste reservoir 102 may also provide information on the status and condition of one or more trapdoors, including the trapdoor mechanism 112, 212. In some implementations, the burn chamber 104, 216 may be disabled until the trapdoor mechanism 112, 212 and/or one or more other trapdoors are closed.

Certain sensors, including the sensors 152 associated with the waste reservoir 102 may also provide feedback provided by users indicating type of waste added to the waste reservoir 102, etc. In some examples, one or more switches, touch-sensitive panels and/or movement detectors may be provided within the interior or on the exterior of a portable toilet to detect human activity, including approach, presence and/or departure of a user. Switches or touch-sensitive panels may provide input from the user indicating a flush-and-incinerate cycle is desired, and other information.

The burn chamber 104, 216 receives waste from the waste feed conduit 130 and a flow of air 132. A burner 122, 204 provides a flame within the burn chamber 104, 216 sufficient to combust, consume or otherwise reduce waste material located within the burn chamber 104, 216. The burner 122, 204 may receive a flow of fuel from a fuel supply, which may be provided from a natural gas line or a fuel tank. In the illustrated example, the burner 122, 204 receives a flow of pressurized liquid fuel or gaseous fuel from a fuel tank 108 under the control of the processing circuit 110. In one example, the fuel tank 108 may store a supply of hydrogen, propane or butane gas. In another example, the fuel tank 108 may provide a flow of diesel. The processing circuit 110 may control a valve, solenoid or other actuator 128 that enables the flow of fuel in a fuel line 138 coupled to a burner 122, 204 located proximate to, or at least partially within the burn chamber 104, 216. The processing circuit 110 may also cause an ignitor in or near the burner 122, 204 to ignite the fuel delivered to the burn chamber 104, 216 through the fuel line 138.

In some instances, the flow of air 132 is produced by a blower 114 that pulls external air into the burn chamber 104, 216. The blower 114 may restrict the flow of air 132 when disabled, thereby providing a failsafe mechanism that can limit or suppress burning of fuel and thereby limit the temperature within the burn chamber 104, 216 in the event that the burner 122, 204 fails to turn off. The processing circuit 110 may control a switch 116 that enables or disables operation of the blower 114.

In operation, the burner 122, 204 may burn or evaporate waste materials located within the burn chamber 104, 216. The waste materials may be reduced to primarily an ash residue and exhaust gases. The exhaust gases may be extracted as an exhaust flow 134 when an exhaust fan 118 is operated. The processing circuit 110 may control a switch 120 that enables or disables operation of the exhaust fan 118. The processing circuit 110 may be configured to cause the exhaust fan 118 to drive the exhaust flow 134 to the exterior of the compact waste combustion system 100. In the illustrated example, the exhaust flow 134 is pulled into a scrubber 106 or other filtration system that can remove or reduce potentially toxic or undesirable constituents in the exhaust gases. In one example, the scrubber 106 may include a catalytic converter that receives and cleans the exhaust gases. The resultant exhaust outflow 136 may then be vented to the exterior of the compact waste combustion system 100.

Ash, cinder and other solids remaining after an incineration operation may be extracted using an ash disposal module or subsystem. In one example, solids may remain after incineration and may be caused to fall under gravity into an ash collection tray 126, 208 that can be removed when the burner 122, 204 is inactive, and/or when the temperature within the burn chamber 104, 216 is below a maximum temperature level defined for operational safety and for other reasons. In some examples, the ash collection tray 126, 208 may be configured to receive at least a portion of the waste 228 that is to be burned and to receive a flame used to burn the waste. In one example, a direct-flame burner 214 may provide a flame directly onto the portion of the waste 228. In another example, the direct-flame burner 214 may provide a flame directly into the ash collection tray 126, 208 causing the portion of waste 228 to be heated to a temperature that causes a combination of evaporation and incineration.

A trapdoor or cover may be operated to seal a housing that holds the ash collection tray 126, 208 during operation. An interlock mechanism may be provided to prevent burning operations when the ash collection tray 126, 208 is removed. The ash collection tray 126, 208 may be removed using a handle 226, or the like. The ash collection tray 126, 208 may be secured with a safety mechanism 206 to ensure the ash collection tray 126, 208 can be safely used in mobile vehicles.

Incineration operations involving the burn chamber 104, 216 may be managed by the processing circuit 110. In one example, one or more trapdoors may be monitored, opened and closed in response to control signals or commands provided by the processing circuit 110. The control signals or commands are timed and configured to permit extraction of the ash collection tray 126, 208 or to enable the burn chamber 104, 216 to be safely cleaned or maintained. The processing circuit may be electrically coupled to an actuator, motor, electromagnetic or other device that can be configured to open, close and/or lock a trapdoor.

In another example, the processing circuit 110 may activate and deactivate the blower 114, the exhaust fan 118, the valve, solenoid or other actuator 128 that enable fuel flow, and the ignitor in or near the burner 122, 204 that ignites the fuel in a sequence configured to efficiently dispose of waste material in the burn chamber 104, 216.

The processing circuit 110 may control operations involving the burn chamber 104, 216 using feedback information or measurements received from one or more sensors 156 coupled to, or associated with the flow of air 132, one or more sensors 158 coupled to or associated with the burn chamber 104, 216, one or more sensors 160, 164 associated with the exhaust flow 134, one or more sensors 162 coupled to or associated with the scrubber 106 and/or one or more sensors 166 coupled to or associated with the flow of fuel in the fuel line 138 or the fuel within a fuel tank or cylinder. The sensors 156, 158, 160, 162, 164, 166 may provide measurements related to temperature, pressure, levels of fuel, levels of fluid, rate of flow, direction of flow, and/or the state of valves, actuators, solenoids, switches.

In one example, the processing circuit 110 may be configured to monitor temperature of the flow of air 132, temperature within the burn chamber 104, 216, temperature on an outside wall 124 or firewall of the burn chamber 104, 216, temperature of the exhaust flow 134, temperature within the scrubber 106 and/or temperature of the exhaust outflow 136.

In another example, the processing circuit 110 may be configured to monitor pressure or volume of fuel in the fuel tank 108, remaining battery charge in a power source 150 used by the compact waste combustion system 100, level of ash in the ash collection tray 126, 208, and/or quantity or level of waste remaining in the waste reservoir 102 using, for example, one of the corresponding sensors 152.

The processing circuit 110 may access the sensors 152, 154, 156, 158, 160, 162, 164, 166 through interface circuits 148 configured to couple the processing circuit 110 to components of the compact waste combustion system 100 through a communication link 140. The communication link 140 may include a serial or parallel bus. In one example, the interface circuits 148 may include a wireless radio that enables the processing circuit 110 to communicate wirelessly with certain sensors 152, 154, 156, 158, 160, 162, 164, 166. In another example, the processing circuit 110 communicates with certain sensors 152, 154, 156, 158, 160, 162, 164, 166 through a serial bus which may be operated by a proprietary or standards-defined protocol. In the latter example, the interface circuits 148 may enable the processing circuit 110 to communicate as a bus master. In another example, the processing circuit 110 communicates directly with certain of the sensors 152, 154, 156, 158, 160, 162, 164, 166. The interface circuits 148 may include line driver circuits and receiver circuits in addition to the control logic used to support communication with sensors 152, 154, 156, 158, 160, 162, 164, 166.

The processing circuit 110 may monitor the sensors 152, 154, 156, 158, 160, 162, 164, 166 to ensure or facilitate operation in accordance with safety protocols defined for the compact waste combustion system 100. In one example, the processing circuit 110 may monitor various sensors throughout the compact waste combustion system 100 to ensure that all components operate within nominal maximum temperature ranges defined by the safety protocols. In another example, the processing circuit 110 may monitor the operation of the blower 114 that pulls external air into the flow of air 132 and the exhaust fan 118 to ensure that products of incineration are properly processed and expelled. In another example, the processing circuit 110 may monitor the status and operation of a filter or catalytic converter in the scrubber 106 to ensure adequate cleaning of the exhaust flow 134 and to ensure that emissions in the exhaust outflow 136 comply with governmental and/or other standards.

The processing circuit 110 may operate as a controller and communication hub for the sensors 152, 154, 156, 158, 160, 162, 164, 166 and electromechanical devices, including pumps, actuators including the valve, solenoid or other actuator 128, the blower 114 that pulls external air into the flow of air 132, and the exhaust fan 118. The power source 150 may be adapted to provide power used to activate the trapdoor mechanism 112, waste pumps or impellers, the actuators, the blower 114 that supplies the flow of air 132, the exhaust fan 118 and/or the ignitor in the burner 122, 204.

The compact waste combustion system 100 may be installed within a housing. The housing may include walls 220, 222 and a base 224 constructed from a sheet metal material or another material. In some implementations, the walls 220, 222 and the base 224 may be included in a load bearing frame, or at least some of the walls 220, 222 or the base 224 may be attached to a load bearing frame. The load bearing frame may support the bowl 202 and the burn chamber 104, 216, for example. At least one air vent may be included to allow air to circulate freely within the housing, to evacuate the exhaust outflow 136 and/or to provide oxygen to the burn chamber 104, 216.

The housing may provide a location or compartment configured to secure the power source 150 or components of a power supply. In one example, the power source may include a battery that provides a 12 VDC operating voltage. In one example, the battery may be configured as a back-up battery for a system that operates from an external power supply. The external power supply may be provided at 120 or 240 VAC operating voltages, for example. The components of a power supply maintained within or attached to the housing may include a transformer, inverter, circuit breaker, a photo-voltaic module (solar panel), and the like.

The housing may further provide a location or compartment configured to secure a fuel tank or reservoir. A coupling attached or supported by the housing may conduct a fuel supply received from a pipe or conduit to a pump or to a valve, solenoid or other actuator 128 that controls access to the burn chamber 104, 216. The fuel supply may be received from a gas main, or a tank that provides propane, butane, hydrogen, natural gas, diesel, or another combustible.

The housing may be configured for use in mobile vehicles. In some implementations, the housing may be equipped with, or attached to mounting brackets used to secure the housing in a mobile vehicle.

Figure 5:
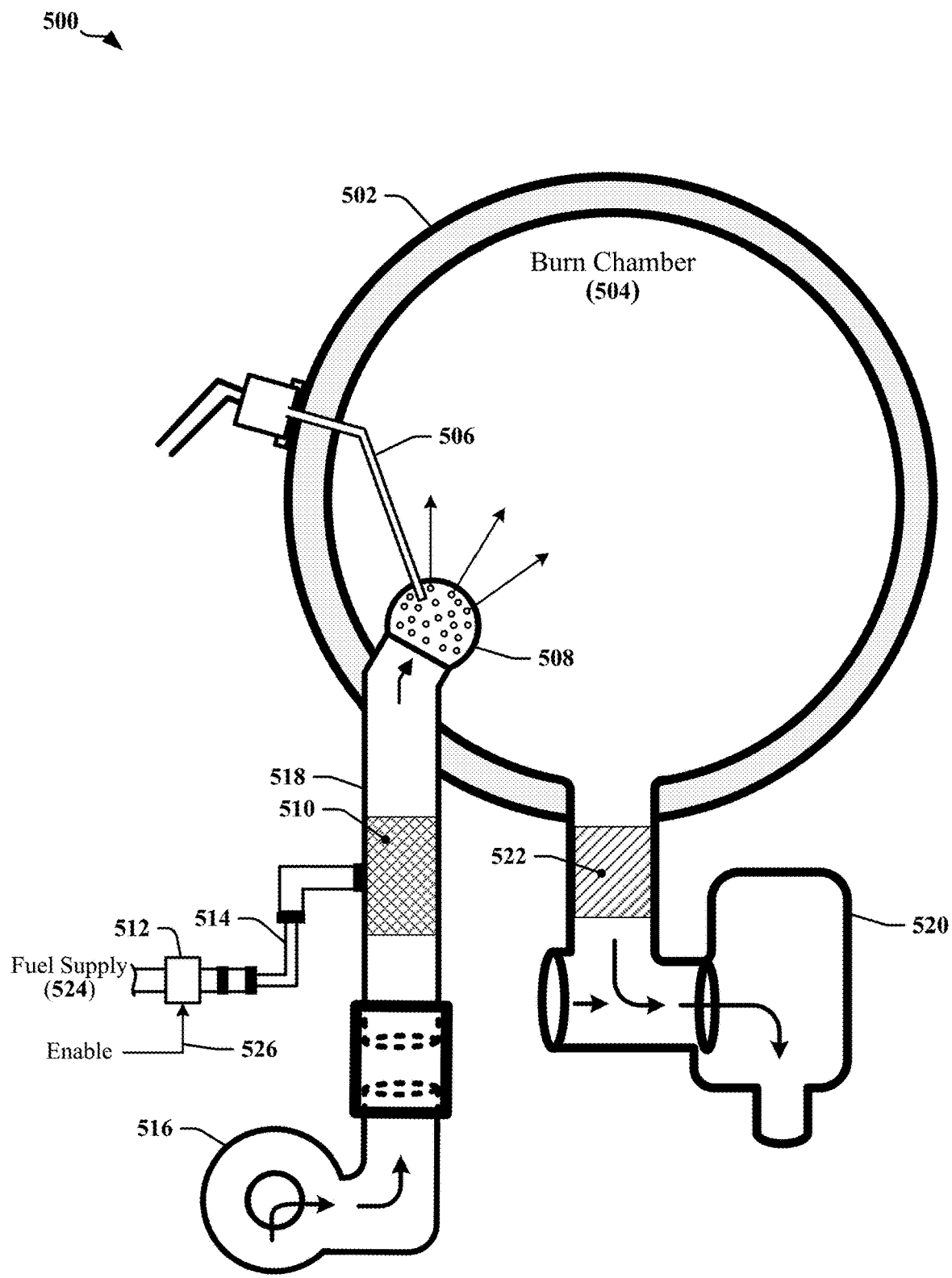
FIG. 5 provide a cross-sectional view of a first burn chamber provided in accordance with certain aspects of the disclosure.
Figure 6:
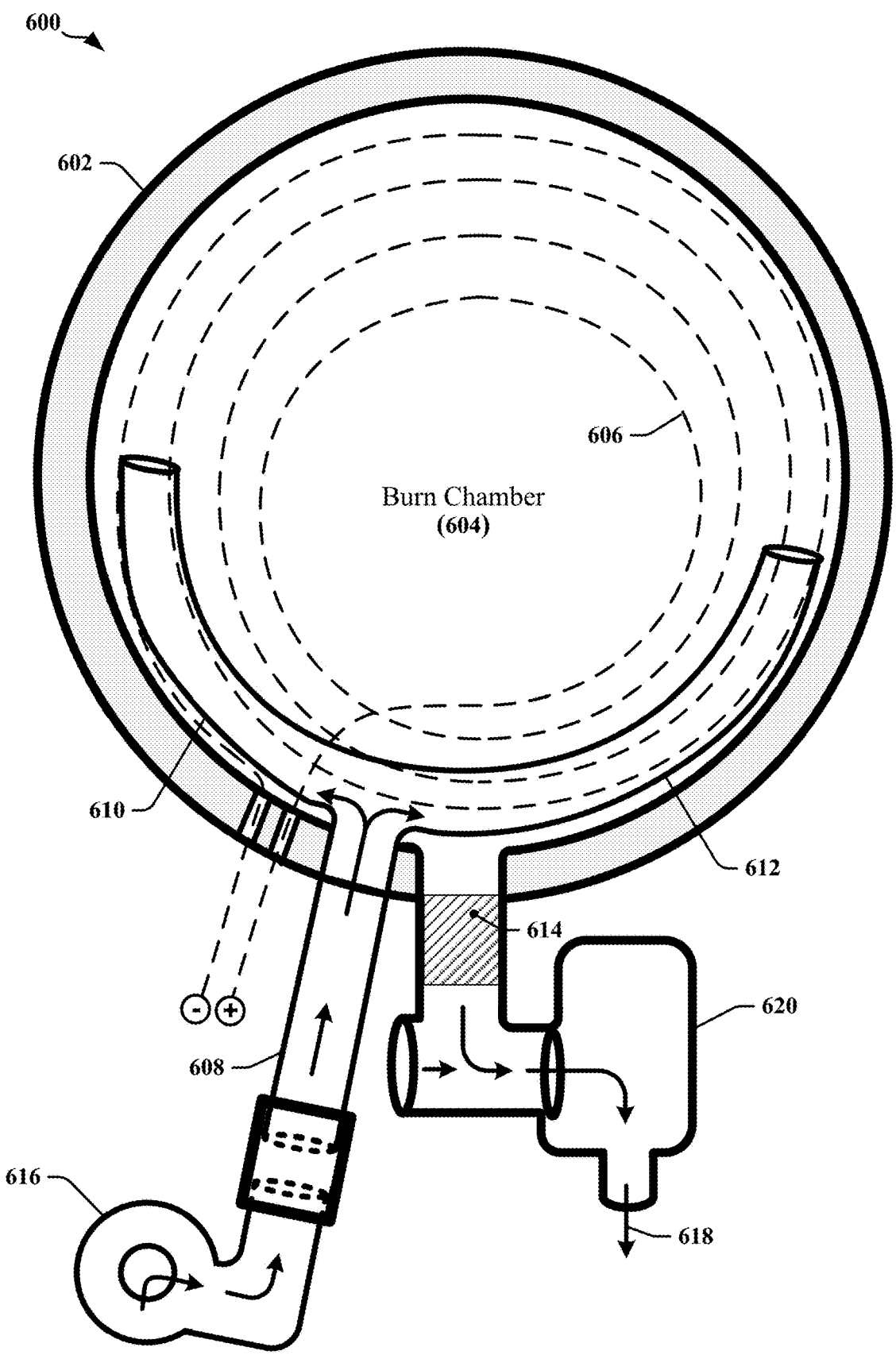
FIG. 6 provide a cross-sectional view of a second burn chamber provided in accordance with certain aspects of the disclosure.

FIGS. 5 and 6 provide examples of burn chambers 500 and 600 in cross-sectional views. The processing circuit 110 may be configured to monitor and/or control operation of the burn chamber 500 or 600. The processing circuit 110 may be configured to determine when a burn should be initiated and may configure the duration of cool down periods, initiate cool down periods and/or determine when each cool down period has ended. In one example, the cool down period has a preconfigured fixed duration. In another example, the cool down period continues until one or more temperatures associated with the burn chamber 500, 600 or its housing has fallen below a preconfigured threshold level.

The direct flame burn chamber 500 illustrated in FIG. 5 has a burn chamber 504 formed within an outer shell 502. The outer shell 502 may be multi-layered and/or insulated. The outer shell 502 may form a protective firewall that can confine waste to be burned, heat of combustion and combustion products to the interior of the burn chamber 504 until extracted through extraction systems.

During incineration operations, a burner fan 516 may draw air into a burner tube 518. Fuel received from a fuel line 514 is also introduced into the burner tube 518 where it mixes with the air to produce a fuel-air mixture. In one example, a valve, solenoid or other actuator 512 is used to control a flow of gas or other fuel into the burner tube 518. The valve, solenoid or other actuator 512 may respond to a control signal 526 that determines when the valve, solenoid or other actuator 512 is opened or closed. In some examples, the control signal 526 may indicate a setting of the valve, solenoid or other actuator 512 that may select a level of flow to be permitted through the valve, solenoid or other actuator 512. The control signal 526 may be provided by a processing circuit 110, controller, sequencer or other control logic.

In some examples, the housing has a storage compartment, mount or location (not shown) configured to conceal or secure an external tank that provides a fuel supply 524. In some examples, the housing has an externally accessible fixture, fitting or coupling that is configured to receive a fuel supply 524 from an external tank or gas main. The fuel supply 524 may be received from a gas main or tank that provides hydrogen, propane, butane, natural gas, diesel or another combustible.

The fuel-air mixture in the burner tube 518 may be passed through a diffuser 510 to obtain a diffused fuel-air mixture. The diffused fuel-air mixture may be conducted by the burner tube 518 to a burner 508 that is coupled to, includes or is collocated with an ignitor 506. In one example, the ignitor 506 ignites the diffused fuel-air mixture by providing a spark. In some instances, the burner 508 is a direct flame burner 508 that incinerates wastewater, paper and other waste materials with a direct flame directed into or onto a stainless-steel collection tray.

The burn chamber 600 illustrated in FIG. 6 uses an electrical burner. A burn chamber 604 is formed within an outer shell 602. The outer shell 602 may be multi-layered and/or insulated and may form a protective firewall that can confine waste to be burned, heat of combustion and combustion products to the burn chamber 604 until extracted through extraction systems.

During incineration operations, a burner fan 616 may be controlled to draw air into a conduit 608 and may force the air into the burn chamber 604. In the illustrated example, the conduit 608 bifurcates such that the air enters the burn chamber 604 through two branches 610, 612. In some examples, an electrical heating element 606 may be configured to cause incineration of waste within the burn chamber 604. In one example, the electrical heating element 606 may include an induction heater that provides an electromagnetic flux that causes eddy currents in a heating plate, tube, strip or other element that is configured to provide high heat from the top or bottom of a stainless-steel collection tray. In another example, the electrical heating element 606 may operate by passing a current though a metallic, ceramic, semiconductor or polymer resistive element configured to provide the high heat from the top or bottom of a stainless-steel collection tray. In the illustrated example, the electrical heating element 606 includes an electrical ignition coil, that may operate in the manner of a diesel glow plug or the like. The electrical heating element 606 may be configured to cause the wastewater and paper inside the stainless-steel collection tray to be evaporated and/or incinerated.

Hot air and gases generated within the burn chamber 504, 604 and/or in the collection tray can be vented through an optional catalytic converter 522, 614. An exhaust fan 520, 620 pulls the air from the burn chamber 504, 604. In one example, the hot air or gases exit through the catalytic converter 522, 614 and are vented as an exhaust 618 through a 3 inch (76 mm) vent pipe system 302 (see FIG. 3) that vents to the exterior the portable toilet.

The processing circuit 110 controls the activation of the burner fan 516, 616 and the exhaust fan 404, 520, 620. The processing circuit 110 may be coupled to a display panel 304 that can be configured to indicate the status of the burn cycle (burning, complete, error, etc.), and can be further configured to indicate errors or maintenance alerts or issues. In some implementations, the display panel 304 may be part of a control panel 306.

In some implementations, the burn chamber 104 may be installed in a portable toilet that includes additional components that can be provided for sanitary purposes and for other reasons. For example, the portable toilet may include a built-in water bag 410 that supports a bowl rinse function. In one example, the water bag carries a fluid that includes water, detergent, degreaser, disinfectant and/or deodorizer. In another example, the water bag carries water that is mixed with a detergent, degreaser, disinfectant and/or deodorizer during use, typically as the water is flowing from the water bag. An insert may be provided for each use of the bowl 202, where the insert may be incinerated with the waste. In one example, a paper liner placed inside the bowl 202 prior to usage may be provided from a dispenser in a seat assembly. After usage, a user may use a seat cover to close the seat and thereby to enable or initiate a rinse cycle. Optionally, the user activates or requests a rinse cycle by pressing a "RINSE" button or icon on a display panel 304. The rinse cycle may be performed using the built-in or attached water bag 410.

In some instances, the user may select a type of rinse cycle and/or incineration duration. For example, the user may indicate the nature of the waste, which may include liquid and/or solid wastes. The processing circuit 110 may check sensors such as a temperature safety sensor 406 to ensure that all safety limit switches indicate a safe condition. For example, the processing circuit 110 may check that the state of the trapdoor mechanism 112, 212, ash collection tray 126, 208, and toilet seat indicates complete closure. The processing circuit 110 may then open a trapdoor mechanism 112, 212 for a preconfigured duration of time calculated to allow contents of the bowl 202 to be evacuated or flushed into the waste reservoir 102. The trapdoor mechanism 112, 212 may then be closed.

The processing circuit 110 may activate the exhaust fan 118, which remains active until the entire burn cycle has been completed and for an additional period of time. The processing circuit 110 may transmit a start signal or command that causes the fuel to flow through the fuel line 138 to the burner 122, 204 and that causes the ignitor in the burner 122, 204 to ignite the fuel and initiate burning within the burn chamber 104, 216.

In one example, the burner fan 516, 616 and the valve, solenoid or other actuator 512 are activated or turned on. Gas travels through a fuel line 514 and mixes with air inside the burner tube 518 and passes through a diffuser 510 before it reaches the ignitor 506. The ignitor sparks and ignites the gas. In some instances, the burner has an outside ignitor and a direct flame burner 508. The direct flame burner 508 can evaporate water in the wastewater and incinerate solids and paper using a direct flame inside a stainless-steel collection tray. The electrical burners may use an induction heater that provides high heat from the top or bottom of the ash collection tray 126, 208. One or more burner fans 516, 616 provide air to the direct burner or heater to maximize burner efficiency. In the example illustrated in FIG. 6, the burner fan 616 has split paths for air flows.

The processing circuit 110 activates the burner 122, 204 or heater. The burner 122, 204 or heater remains active for a configured period of time before being deactivated. A cool down process runs for a configured period of time or until temperatures in the system have fallen below threshold levels. In some examples, multiple iterations may be performed without cool down or with reduced cool down cycles. This process can continue until all liquid, paper, and solid waste is expected to have been evaporated or incinerated, leaving a small amount of sterile ash.

Figure 7:
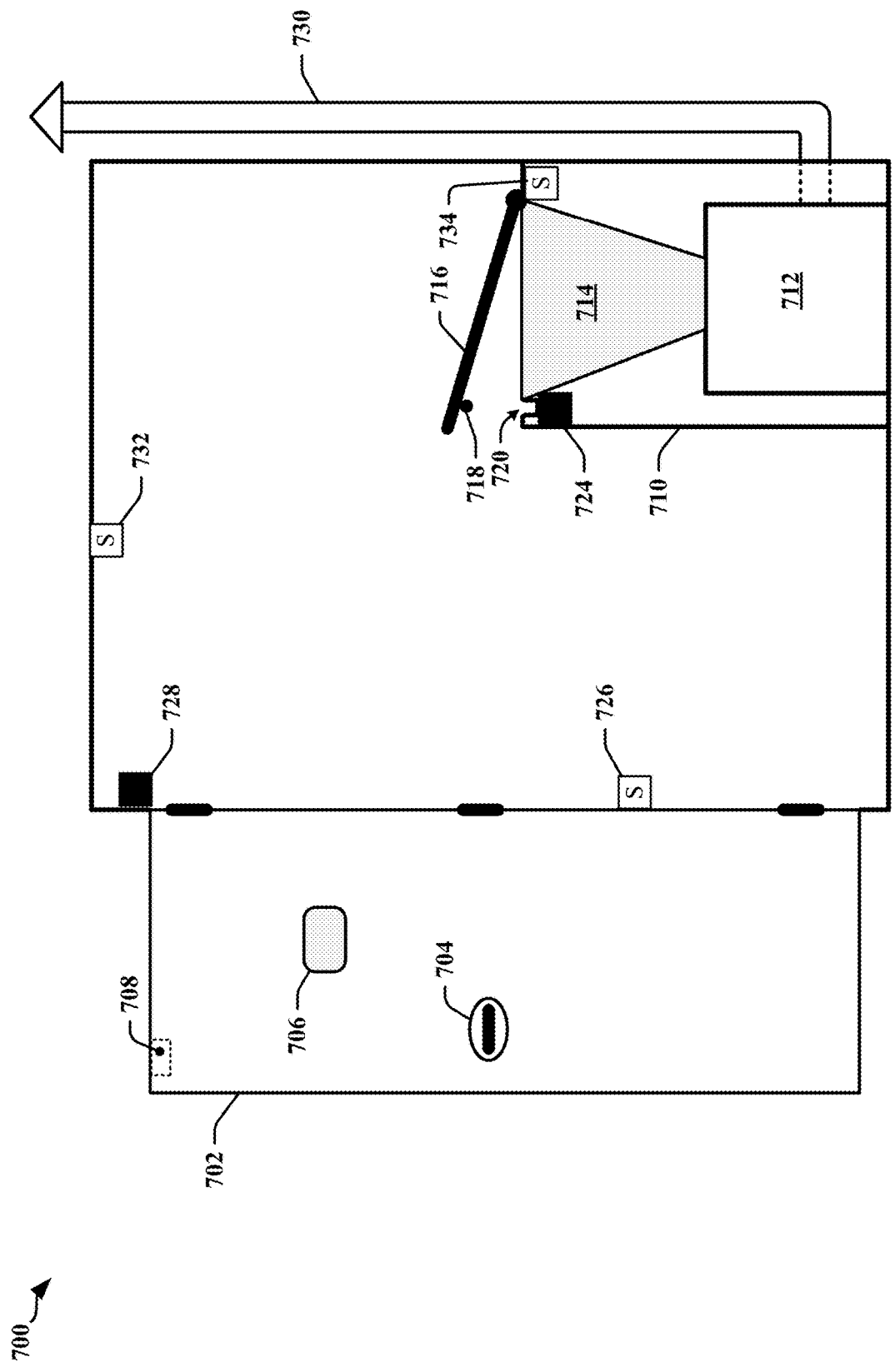
FIG. 7 is a schematic representation of an enclosure that houses a compact waste combustion system in accordance with certain aspects disclosed herein.

FIG. 7 is a schematic representation of a structure 700 that houses a compact waste combustion chamber 712 in accordance with certain aspects disclosed herein. In one example, the structure 700 may serve or be embodied in a portable toilet. In other examples, the structure 700 may be provided as a fixture in a moving vehicle, such as a bus, boat, train, truck, trailer, recreation vehicle or other types of vehicle. A seat assembly 710 encloses a compact waste combustion chamber 712 and a bowl 714. A seat cover 716 may be used to seal the bowl 714 during non-use or during burn cycles. One or more vent pipes 730 may be coupled to the compact waste combustion chamber 712 and may be used to vent exhaust gases from the compact waste combustion chamber 712 to the exterior of the structure 700. The vent pipe system 302 of FIG. 3 is one example of a vent pipe 730. Other configurations of pipes, vents or conduits may be provided to supply an airflow to the compact waste combustion chamber 712.

A user may access the structure 700 through a door opening. A door 702 may be opened, closed and/or locked manually using a door handle 704 operated by the user. In some implementations, an electrically operated locking system may be used to secure the door 702 when a burn cycle is being performed. In some implementations, exterior signal lamps or lights may be provided to enable a user to determine status of the structure 700. In some implementations, a display system 706 may be part of a user interface that enables a user to determine status of the structure 700 provide information to a controller, request that the door 702 be locked or unlocked, and/or to initiate a flush or incineration cycle. In one example, an electromagnet 728 provided within the structure 700 engages an armature plate 708 provided in the door 702 when the electromagnet 728 is energized and the door 702 is closed, such that the force necessary to overcome the resultant electromagnetic field is greater than the force that can be exerted by a typical user. In another example, an electromagnetic lock includes a deadbolt, where a bolt or slug is driven axially along the core of an electromagnetic coil. In the latter example, the deadbolt may be locked when the electromagnetic coil is energized and unlocked by a spring when the electromagnetic coil is de-energized, or vice versa. In another example, a stepping motor, direct current (DC) motor or other motor may be employed to drive a deadbolt lock. In one example, a stepping motor or brushless DC motor may be used when the compact waste combustion chamber 712 includes a gas burner.

The door opening may be instrumented with one or more sensors 726 that can detect door opening events, door closing events, door status and/or lock status. Other sensors 732 may be deployed within the structure 700. For example, one or more sensors 732 provided within the structure 700 may detect presence of a user based on heat (infrared sensor) or motion (doppler sensor), etc.

In some implementations, an electrically operated locking system may be used to secure the seat cover 716 when a burn cycle is being performed. In one example, an electromagnet 724, which may be coupled to or provided in a recess 720 of the seat assembly 710, engages a fastening element 718, plate or armature provided on the seat cover 716 when the electromagnet 724 is energized and the seat cover 716 is closed. In one example, the force necessary to overcome the resultant electromagnetic field is greater than the force that can be exerted by a typical user. Other types of electromagnetic lock may be used, including locks that employ a deadbolt, a stepping motor, (DC) motor or other motor. The seat cover 716 may be instrumented with one or more sensors 734 that can indicate status of the seat cover 716 and/or the electromagnetic lock associated with the seat cover 716.

After using the waste combustion system provided within the structure 700, a user may close the seat cover 716 to initiate a rinse cycle and/or a burn cycle. In one example, the processing circuit 110 may receive a signal that the seat cover 716 has been closed and may check that the state of the trapdoor mechanism 112, 212, ash collection tray 126, 208, and toilet seat indicates complete closure of the waste disposal path into the compact waste combustion chamber 712. If the seat cover 716 is opened during a burn cycle, the burner or heater can be immediately deactivated, and the burner or heater remains inactive until the seat cover 716 has been fully closed again. In some instances, the processing circuit 110 may delay the burn cycle until the structure 700 is vacant, as indicated by the sensors 732 for example.

With continued reference to FIG. 1, the processing circuit 110 may include a processor 142 that operates certain circuits or modules that support the use and operation of the structure 700. Control or driver circuits 144 may be configured to operate one or more electrically-operated locks. Sensor monitoring and/or management circuits 146 may be coupled to various sensors and may be operable to configure, manage, monitor and/or read the sensors. User interface circuits 170 may be configured to interact with users and system operators. The processing circuit 110 may include a radio frequency (RF) transceiver 168 that supports communication with a controlling system and/or other devices related to or associated with waste combustion systems.

The processing circuit 110 may be configured to use the sensor monitoring and/or management circuits 146 and the control or driver circuits 144 to implement operating procedures and safety procedures defined for the waste combustion system or the structure 700. In one example, the sensor monitoring and/or management circuits 146 may report status for various trapdoors and the seat cover 716 and may indicate whether a user is present inside the structure 700. The processing circuit 110 may then determine when operating procedures and safety procedures can be commenced, and whether operating procedures and safety procedures should be terminated when certain events are detected.

In certain implementations, the processing circuit 110 may be configured to monitor temperatures within the compact waste combustion chamber 712, the seat assembly 710, the vent pipe 730 and/or other enclosed components to implement or enforce a cool down cycle after an incineration cycle has completed. In one example, the processing circuit 110 may activate the blower 114 and/or the exhaust fan 118 to cause a flow of air at ambient temperature through the compact waste combustion chamber 712 until temperatures measured within the compact waste combustion chamber 712, the seat assembly 710, the vent pipe 730 and/or the other enclosed components fall below a maximum safe operating temperature configured by a system operator and/or defined by state regulation or by design specification. In some instances, the processing circuit 110 may be configured to lock or otherwise secure the seat cover 716 and/or the door 702 when temperatures measured within the compact waste combustion chamber 712, the seat assembly 710, the vent pipe 730 and/or the other enclosed components remain above a maximum safe operating temperature.

In certain implementations, the processing circuit 110 may be configured to terminate an incineration cycle, including disabling a burner, when a user enters the structure 700 and/or opens the seat cover 716. In one example, the processing circuit 110 may be configured to lock the door 702 and/or the seat cover 716 when no user is present within the structure 700 and/or before initiating an incineration cycle. In another example, the user interface circuits 170 may provide the processing circuit 110 with information derived from the display system 706 or an input system associated with the display system 706, where the provided information may be used to configure one or more procedures and/or initiate a safety protocol. In some instances, the processing circuit 110 may be configured to monitor for pollutants or harmful gases in the exhaust gases and may determine whether operations should cease when defined thresholds have been exceeded.

The processing circuit 110 may be configured to communicate with a centralized or local controller or management system through the RF transceiver 168. In one example, the processing circuit 110 may communicate status and maintenance information to the controller or management system. The processing circuit 110 may indicate, for example, status of fuel supplies, error conditions, usage statistics, temperatures, air-quality impacts of exhaust gases, level of ash in the collection tray 126, 208, etc.

The processing circuit 110 may be configured to communicate through the RF transceiver 168 with other processing circuits in nearby portable toilets, or a local controller of multiple portable toilets. In one example, the processing circuit 110 may exchange status information that may be used to coordinate incineration cycles, balance usage between multiple portable toilets, to provide wireless availability information or notifications to users and for other reasons. For example, the processing circuit 110 may delay an incineration cycle when availability of portable toilets in a grouping is limited. In some instances, the processing circuit 110 may indicate availability information on the display system 706.

The processing circuit 110 may be configured to manage burn cycles and/or cool down cycles to maximize or optimize energy efficiency. Cycles in a compact waste combustion chamber 712 can be coordinated or managed to improve energy efficiency by delaying or combining multiple cycles of the same type or different types. Multiple compact waste combustion chambers may be operated such that burn cycles may be coordinated or scheduled at different times. Cool down cycles may be coordinated or scheduled at different times. In some instances, burn cycles and/or cool down cycles may be dynamically coordinated between compact waste combustion chambers.

Figure 8:
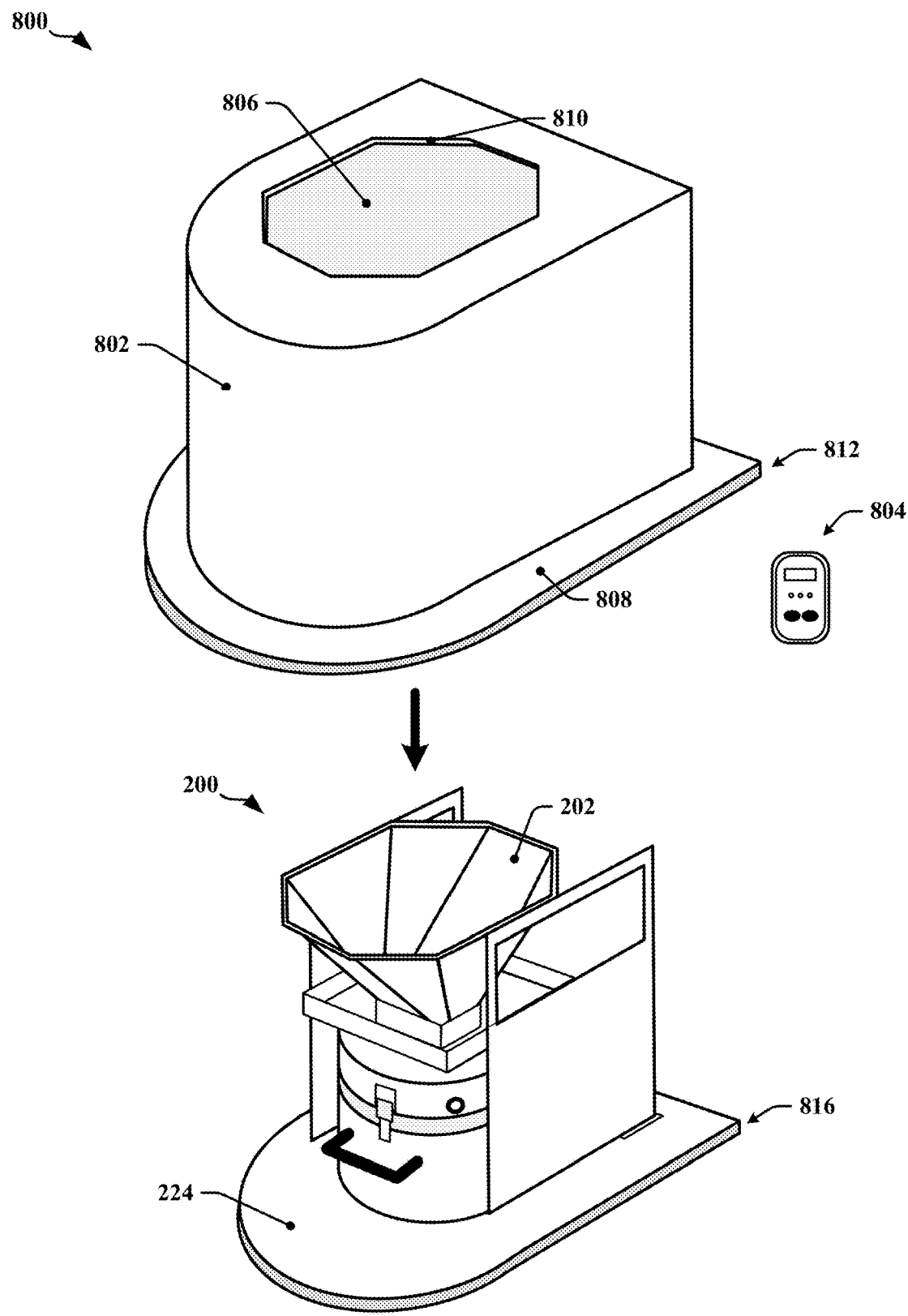
FIG. 8 illustrates an example of a system that includes an enclosed waste incineration system in accordance with certain aspects of the disclosure.

FIG. 8 illustrates an example of a waste incineration system 800 that includes the physical implementation 200 of the waste combustion system 100 illustrated in FIGS. 1-4 and a housing 802 or enclosure. The housing 802 or enclosure may attach to and cooperate with the base 224 of the waste combustion system 100 to enclose the waste incineration system 800. The housing 802 or enclosure may be configured to isolate elements of the waste combustion system 100 from the external environment. Accommodation is made in the housing 802 or enclosure for the passage of pipes and vents through sealed apertures.

The waste incineration system 800 further includes a waterproofed control panel 804. In some examples, the control panel 804 can communicate wirelessly with the waste combustion system 100. In some examples, the waterproofed control panel 804 may be attached to the housing 802. The waterproofed control panel 804 may be detachable from the housing 802 and may be reattached to the housing 802 as needed. In some examples, the waterproofed control panel 804 may be attached to a wall of the structure 700 illustrated in FIG. 7. The waterproofed control panel 804 may be detachable from the wall of the structure 700 and may be reattached to the wall of the structure 700 as needed.

In some examples, the housing 802 can prevent water from intruding into certain components of the waste combustion system 100. In one example, the housing 802 can prevent fluids from reaching the burn chamber 216, which can malfunction or be damaged when cooler fluids contact hot elements or surfaces of the burn chamber 216. In another example, the housing 802 can prevent fluids from seeping into the waste combustion system 100 and thereby prevent fluid from contaminating fuel used by certain types of burners. The housing 802 or enclosure may be configured to exclude fluids and to isolate the burner from other structures and surfaces in the surrounding environment. A suitably waterproofed waste incineration system 800 and its waterproof control panel 804 may be installed inside a shower room located in a recreational vehicle (RV), van conversion, motorhome, bus, boat, or another type of vehicle. A suitably waterproofed waste incineration system 800 and its waterproof control panel 804 may be installed inside a shower room located in a tiny home, cabin, or another type of accommodation.

The housing 802 may be constructed from a variety of suitable materials. In some examples, the housing 802 may be manufactured from metal components to provide strength and impact resistance in addition to waterproofing properties. In some examples, the housing 802 may be manufactured from one or more polymer materials that may be molded to form a housing 802 that has a single part. In some examples, the housing 802 may be manufactured from some combination of sheet metal and polymer parts. In some examples, the housing 802 may be manufactured using parts that are multilayered and may include some combination of sheet metal and polymer layers. Welds, seams and joints in a housing 802 may be sealed using some combination of adhesives and caulking materials.

In the illustrated example, the housing 802 has a flange 808 configured to rest upon the base 224. In some examples, the flange 808 may be mechanically fixed to the base 224 using interlocking features. In some examples, the flange 808 may be bolted, riveted, welded or glued to the base 224. In the illustrated example, a first gasket 812 is provided under the flange 808 and the first gasket is configured to provide watertight seal between the housing 802 and the waste combustion system 100. A second gasket 810 may be provided is provided between the edges of an opening 806 in the housing 802 and an upper rim of the bowl 202 of the waste combustion system 100. In some instances, an additional gasket 816 may be provided under the base 224 of the waste combustion system 100. In some instances, other gaskets may be provided to seal openings through which vents and other pipes exit the housing 802. Other openings, including openings that receive fasteners, may be waterproofed using gaskets, caulking and other materials.

Examples of Processing Circuits and Methods

Figure 9:
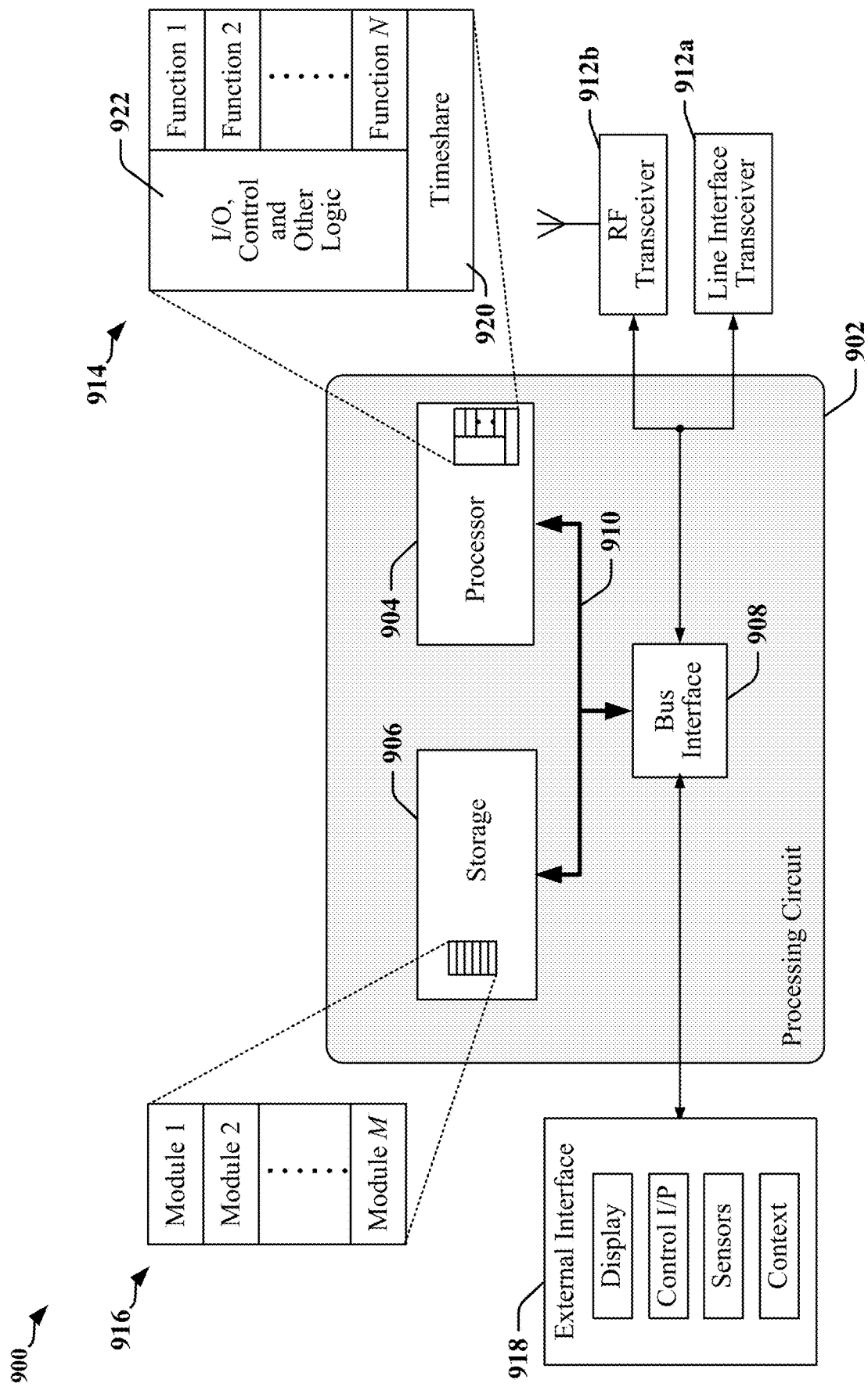
FIG. 9 illustrates a first example of a processing system configured to perform certain functions according to certain aspects described herein.

FIG. 9 is a diagram illustrating a conceptual example of a hardware implementation for an apparatus 900 employing a processing circuit 902. The apparatus 900 may be configured to perform one or more functions disclosed herein. In accordance with various aspects of the disclosure, an element, or any portion of an element, or any combination of elements as disclosed herein may be implemented using the processing circuit 902. The processing circuit 902 may include one or more processors 904 that are controlled by some combination of hardware and software modules. Examples of processors 904 include microprocessors, microcontrollers, digital signal processors (DSPs), ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 904 may include specialized processors that perform specific functions, and that may be configured, augmented or controlled by one of the software modules 916. The one or more processors 904 may be configured through a combination of software modules 916 loaded during initialization, and further configured by loading or unloading one or more software modules 916 during operation.

In the illustrated example, the processing circuit 902 may be implemented with a bus architecture, represented generally by the bus 910. The bus 910 may include any number of interconnecting buses and bridges depending on the specific application of the processing circuit 902 and the overall design constraints. The bus 910 links together various circuits including the one or more processors 904, and storage 906. Storage 906 may include memory devices and mass storage devices and may be referred to herein as computer-readable media and/or processor-readable media. The bus 910 may also link various other circuits such as timing sources, timers, peripherals, voltage regulators, and power management circuits. A bus interface 908 may provide an interface between the bus 910 and one or more transceivers 912*a*, 912*b*. A transceiver 912*a*, 912*b* may be provided for each networking technology supported by the processing circuit. In some instances, multiple networking technologies may share some or all of the circuitry or processing modules found in the one or more transceivers 912*a*, 912*b*. Each transceiver 912*a*, 912*b* provides a means for communicating with various other apparatus over a transmission medium. Depending upon the nature of the apparatus 900, a user interface 918 (e.g., keypad, display, speaker, microphone, joystick) may also be provided, and may be communicatively coupled to the bus 910 directly or through the bus interface 908.

A processor 904 may be responsible for managing the bus 910 and for general processing that may include the execution of software stored in a computer-readable medium that may include the storage 906. In this respect, the processing circuit 902, including the processor 904, may be used to implement any of the methods, functions and techniques disclosed herein. The storage 906 may be used for storing data that is manipulated by the processor 904 when executing software, and the software may be configured to implement any one of the methods disclosed herein.

One or more processors 904 in the processing circuit 902 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 906 or in an external computer-readable medium. The external computer-readable medium and/or storage 906 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 906 may also include, by way of example, a carrier wave, a transmission line, and any other suitable medium for transmitting software and/or instructions that may be accessed and read by a computer. Computer-readable medium and/or the storage 906 may reside in the processing circuit 902, in the processor 904, external to the processing circuit 902, or be distributed across multiple entities including the processing circuit 902. The computer-readable medium and/or storage 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 906 may maintain software maintained and/or organized in loadable code segments, modules, applications, programs, etc., which may be referred to herein as software modules 916. Each of the software modules 916 may include instructions and data that, when installed or loaded on the processing circuit 902 and executed by the one or more processors 904, contribute to a run-time image 914 that controls the operation of the one or more processors 904. When executed, certain instructions may cause the processing circuit 902 to perform functions in accordance with certain methods, algorithms and processes described herein.

Some of the software modules 916 may be loaded during initialization of the processing circuit 902, and these software modules 916 may configure the processing circuit 902 to enable performance of the various functions disclosed herein. For example, some software modules 916 may configure internal devices and/or logic circuits 922 of the processor 904, and may manage access to external devices such as one or more transceivers 912a, 912b, the bus interface 908, the user interface 918, timers, mathematical coprocessors, and so on. The software modules 916 may include a control program and/or an operating system that interacts with interrupt handlers and device drivers, and that controls access to various resources provided by the processing circuit 902. The resources may include memory, processing time, access to the one or more transceivers 912a, 912b, the user interface 918, and so on.

One or more processors 904 of the processing circuit 902 may be multifunctional, whereby some of the software modules 916 are loaded and configured to perform different functions or different instances of the same function. The one or more processors 904 may additionally be adapted to manage background tasks initiated in response to inputs from the user interface 918, the one or more transceivers 912a, 912b, and device drivers, for example. To support the performance of multiple functions, the one or more processors 904 may be configured to provide a multitasking environment, whereby each of a plurality of functions is implemented as a set of tasks serviced by the one or more processors 904 as needed or desired. In one example, the multitasking environment may be implemented using a timesharing program 920 that passes control of a processor 904 between different tasks, whereby each task returns control of the one or more processors 904 to the timesharing program 920 upon completion of any outstanding operations and/or in response to an input such as an interrupt. When a task has control of the one or more processors 904, the processing circuit is effectively specialized for the purposes addressed by the function associated with the controlling task. The timesharing program 920 may include an operating system, a main loop that transfers control on a round-robin basis, a function that allocates control of the one or more processors 904 in accordance with a prioritization of the functions, and/or an interrupt driven main loop that responds to external events by providing control of the one or more processors 904 to a handling function.

Figure 10:
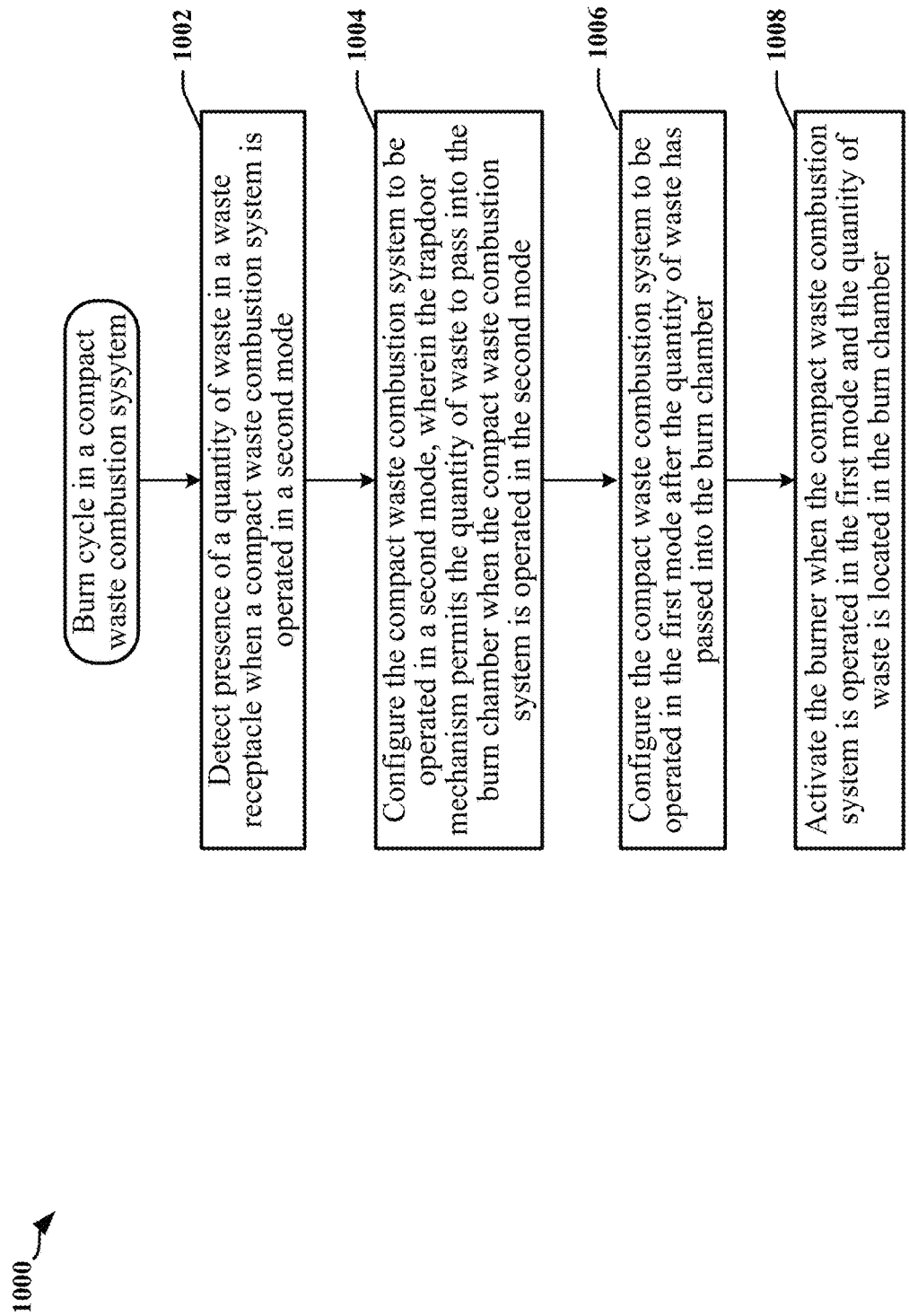
FIG. 10 includes a flowchart illustrating certain aspects of method performed in accordance with certain aspects described herein.

FIG. 10 includes a flowchart 1000 that describes an example of a burn cycle used to incinerate waste in a compact waste combustion chamber. The compact waste combustion chamber may be installed within a portable toilet. The compact waste combustion chamber may include a burn chamber, a trapdoor mechanism configured to seal an entrance to the burn chamber when operated in a first mode, a waste receptacle configured to feed waste material to the burn chamber through the trapdoor mechanism, a burner disposed at least partially within the burn chamber, and a processor.

At block 1002, the processor may detect presence of a quantity of waste in the waste receptacle. At block 1004, the processor may configure the compact waste combustion system to be operated in a second mode. The trapdoor mechanism may permit the quantity of waste to pass into the burn chamber when the compact waste combustion system is operated in the second mode. At block 1006, the processor may configure the compact waste combustion system to be operated in the first mode after the quantity of waste has passed into the burn chamber. At block 1008, the processor may activate the burner when the compact waste combustion system is operated in the first mode and the quantity of waste is located in the burn chamber.

In certain examples, the compact waste combustion chamber may include a coupling configured to conduct a fuel supply to the burner and an ignitor. The processor may be further configured to cause fuel to enter the burn chamber while the burner is activated, and to activate the ignitor to ignite the fuel entering the burn chamber. A blower may be configured to provide a flow of air while the burner is activated, and a diffuser may be configured to mix the flow of air with the fuel entering the burn chamber. The fuel supply may provide a flow of propane, butane, hydrogen or natural gas. In one example, the burner comprises an electrical ignition coil.

In certain examples, a tray deployed within the burn chamber may be configured to receive the waste material that is fed to the burn chamber through the trapdoor mechanism. The quantity of waste may be burnt within the tray when the burner is activated. A temperature sensor may be configured to provide measurements of temperature within the burn chamber. The tray may be removable from the burn chamber when the temperature within the burn chamber is below a maximum safe temperature and when the burner is deactivated.

In certain examples, a tray deployed within the burn chamber may be configured to hold a solid residue generated when the quantity of waste is burned within the burn chamber.

In certain examples, an exhaust fan configured to draw gaseous products of combustion from the burn chamber, and to expel the gaseous products of combustion away from the portable toilet. In one example, a filter may be configured to remove toxic or undesirable constituents from the gaseous products of combustion. In another example, a catalytic convertor may be configured to remove toxic or undesirable constituents from the gaseous products of combustion.

In certain examples, the waste receptacle is a toilet bowl within the portable toilet. The processor may be further configured to initiate a bowl rinse cycle using a flow of water provided by a water bag.

In certain examples, a user interface includes a display panel configured to display status of the burn cycle. The user interface may include one or more user operated input devices. The processor may be further configured to configure a burn cycle in response to one or more inputs received from the one or more user operated input devices.

In some examples, the compact waste combustion system includes an enclosure configured to exclude fluids and to isolate the burner from structures and surfaces adjacent to the compact waste combustion. In some examples, the compact waste combustion system is configured for installation in a recreational vehicle, vehicle conversion, motorhome, tiny home or cabin.

Some implementation examples are described in the following numbered clauses:

1. A compact waste combustion system comprises: a burn chamber; a trapdoor mechanism configured to seal an entrance to the burn chamber when the compact waste combustion system is operated in a first mode; a waste receptacle configured to feed waste material to the burn chamber through the trapdoor mechanism; a burner disposed at least partially within the burn chamber; and a processor configured to: detect presence of a quantity of waste in the waste receptacle; configure the trapdoor mechanism to be operated in a second mode, wherein the trapdoor mechanism permits the quantity of waste to pass into the burn chamber when operated in the second mode; configure the trapdoor mechanism to be operated in the first mode after the quantity of waste has passed into the burn chamber; and activate the burner when the trapdoor mechanism is operated in the first mode and the quantity of waste is located in the burn chamber.

2. The compact waste combustion system as described in clause 1, further comprising: a coupling configured to conduct a fuel supply to the burner; and an ignitor wherein the processor is further configured to: cause fuel to enter the burn chamber while the burner is activated; and activate the ignitor to ignite the fuel entering the burn chamber.

3. The compact waste combustion system as described in clause 2, further comprising: a blower configured to provide a flow of air while the burner is activated; and a diffuser configured to mix the flow of air with the fuel entering the burn chamber.

4. The compact waste combustion system as described in clause 2 or clause 3, wherein the fuel supply comprises a flow of propane, butane, hydrogen or natural gas.

5. The compact waste combustion system as described in clause 1, wherein the burner comprises an electrical ignition coil.

6. The compact waste combustion system as described in any of clauses 1-5, further comprising: a tray deployed within the burn chamber and configured to receive the waste material that is fed to the burn chamber through the trapdoor mechanism.

7. The compact waste combustion system as described in clause 6, wherein the quantity of waste is burnt within the tray when the burner is activated.

8. The compact waste combustion system as described in clause 6 or clause 7, further comprising: a temperature sensor configured to provide measurements of temperature within the burn chamber, wherein the tray is removable from the burn chamber when the temperature within the burn chamber is below a maximum safe temperature and when the burner is deactivated.

9. The compact waste combustion system as described in any of clauses 1-8, further comprising: a tray deployed within the burn chamber and configured to hold a solid residue generated when the quantity of waste is burned within the burn chamber.

10. The compact waste combustion system as described in any of clauses 1-9, further comprising: an exhaust fan configured to draw gaseous products of combustion from the burn chamber, and to expel the gaseous products of combustion.

11. The compact waste combustion system as described in clause 10, further comprising: a filter configured to remove toxic or undesirable constituents from the gaseous products of combustion.

12. The compact waste combustion system as described in clause 10 or clause 11, further comprising: a catalytic convertor configured to remove toxic or undesirable constituents from the gaseous products of combustion.

13. The compact waste combustion system as described in any of clauses 1-12, wherein the waste receptacle is a toilet bowl within a portable toilet.

14. The compact waste combustion system as described in clause 13, wherein the processor is further configured to: initiate a bowl rinse cycle using a flow of water provided by a water bag.

15. The compact waste combustion system of any as described in clauses 1-14, further comprising: a user interface that includes a display panel configured to display status of a burn cycle.

16. The compact waste combustion system as described in clause 15, wherein the user interface further includes one or more user operated inputs and wherein the processor is further configured to configure a burn cycle in response to one or more inputs received from the one or more user operated input devices.

17. The compact waste combustion system as described in any of clauses 1-16, further comprising: one or more sensors configured to detect presence of a user within a portable toilet that incorporates the compact waste combustion system; and deactivate the burner when presence of the user is detected.

18. The compact waste combustion system as described in any of clauses 1-17, further comprising: one or more sensors configured to detect presence of a user adjacent to the compact waste combustion system; and deactivate the burner when presence of the user is detected.

19. The compact waste combustion system as described in any of clauses 1-18, further comprising: an enclosure configured to exclude fluids and to isolate the burner from structures and surfaces adjacent to the compact waste combustion.

20. The compact waste combustion system as described in clause 19, wherein the compact waste combustion system is configured for installation in a recreational vehicle, vehicle conversion, motorhome, tiny home or cabin.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A compact waste combustion system, comprising:
a burner disposed at least partially within a burn chamber; and
a trapdoor mechanism comprising an inner trapdoor configured to prevent waste from flowing from a first chamber toward the burn chamber when closed;
a waste receptacle coupled to the first chamber through an outer trapdoor that is configured to prevent the waste from flowing from the waste receptacle into the first chamber when closed;
one or more sensors configured to detect presence of a user;
a processing circuit configured to:
cause the outer trapdoor to be opened when waste is present in the waste receptacle;
cause the outer trapdoor to be closed and the inner trapdoor to be opened when the waste has flowed into the first chamber;

cause the outer trapdoor and the inner trapdoor to be closed when the waste has passed into the burn chamber;

activate the burner when the outer trapdoor and the inner trapdoor are closed and the waste has passed into the burn chamber; and deactivate the burner when presence of the user is detected.

\* \* \* \* \*